United States Patent
Nonaka et al.

(10) Patent No.: US 10,176,332 B2
(45) Date of Patent: Jan. 8, 2019

(54) SERVER, DATA OUTPUT SYSTEM, DATA OUTPUT METHOD, AND OUTPUT TERMINAL

(75) Inventors: Nobuyuki Nonaka, Tokyo (JP); Toshimi Koyama, Tokyo (JP)

(73) Assignee: UNIVERSAL ENTERTAINMENT CORPORATION, Tokyo (JP)

( * ) Notice: Subject to any disclaimer, the term of this patent is extended or adjusted under 35 U.S.C. 154(b) by 1291 days.

(21) Appl. No.: 11/452,281

(22) Filed: Jun. 14, 2006

(65) Prior Publication Data
US 2006/0289626 A1 Dec. 28, 2006

(30) Foreign Application Priority Data
Jun. 24, 2005 (JP) ................. 2005-184854

(51) Int. Cl.
*G06K 19/06* (2006.01)
*G06F 21/60* (2013.01)

(52) U.S. Cl.
CPC .... *G06F 21/606* (2013.01); *G06F 2221/2153* (2013.01)

(58) Field of Classification Search
CPC .. G06F 21/608; G06Q 10/00; G06Q 20/3674; G06Q 20/40; G07C 9/00111
USPC .................. 705/1, 18, 44, 67; 235/382, 385; 370/279, 329, 338; 455/90.3
See application file for complete search history.

(56) References Cited

U.S. PATENT DOCUMENTS

| | | | |
|---|---|---|---|
| 5,544,321 A | 8/1996 | Theimer et al. | |
| 6,570,610 B1 * | 5/2003 | Kipust | ......................... 348/156 |
| 6,590,877 B1 | 7/2003 | Yamakita | |
| 7,230,519 B2 * | 6/2007 | Coughlin et al. | ............ 340/5.82 |
| 7,324,476 B2 * | 1/2008 | Agrawal et al. | .............. 370/329 |
| 7,513,425 B2 * | 4/2009 | Chung | ......................... 235/385 |
| 2003/0172001 A1 | 9/2003 | Yasuda et al. | |
| 2004/0193742 A1 | 9/2004 | Ikeda | |
| 2005/0094184 A1 | 5/2005 | Suyehira | |
| 2006/0111053 A1 * | 5/2006 | Wu et al. | ..................... 455/90.3 |

FOREIGN PATENT DOCUMENTS

| | | | | |
|---|---|---|---|---|
| EP | 1339015 A1 * | 8/2003 | .......... | G06K 19/077 |
| JP | A-11-187127 | 7/1999 | | |
| JP | A-11-191043 | 7/1999 | | |

(Continued)

*Primary Examiner* — Thien M Le
(74) *Attorney, Agent, or Firm* — Lex IP Meister, PLLC

(57) ABSTRACT

A server comprises an electronic data item receiving unit, an identification code receiving unit, an identification code storing unit, and an electronic data item transmitting unit. The electronic data item receiving unit receives an electronic data item. When a person exists within a predetermined range from an output terminal, the identification code receiving unit receives a first identification code concerning any one of the person and a device used by the person and a second identification code for identifying the output terminal. The identification code storing unit stores therein the first and second identification codes received by the identification code receiving unit, in association with each other. The electronic data item transmitting unit transmits the electronic data item received by the electronic data item receiving unit to a corresponding output terminal based on the first and second identification codes stored in the identification code storing unit.

19 Claims, 9 Drawing Sheets

(56) References Cited

FOREIGN PATENT DOCUMENTS

| JP | A-2003-244059 | 8/2003 |
|---|---|---|
| JP | 2003-323490 | 11/2003 |
| JP | A-2004-015401 | 1/2004 |

\* cited by examiner

FIG. 3

IN-ROOM PERSON DATA TABLE

| STAFF IDENTIFICATION CODE | FAX IDENTIFICATION CODE |
|---|---|
| 0010 | abcd<br>(THIRD FACSIMILE MACHINE) |
| 0013 | efgh<br>(FIFTH FACSIMILE MACHINE) |
| ⋮ | ⋮ |

SERVER, DATA OUTPUT SYSTEM, DATA OUTPUT METHOD, AND OUTPUT TERMINAL

CROSS REFERENCE TO RELATED APPLICATION

This application is based upon and claims the benefit of priority from the prior Japanese Patent Application No. 2005-184854, filed on Jun. 24, 2005, the entire contents of which are incorporated herein by reference.

BACKGROUND OF THE INVENTION

1. Field of the Invention

The present invention relates to a server that transmits electronic data to an output terminal, a data output system that includes the server and output terminals, a data output method for outputting electronic data to an output terminal, and an output terminal.

2. Description of Related Art

An increasing number of companies are introducing a free-space office in which each staff member does not have his/her own seat and is allowed to freely sit in any empty seat to work thereat. In the free-space office, however, when a staff member wants to communicate with another staff member, he/she has to find where another staff member stays, because staff members do not have his/her own seats. A possible way to solve this problem is, for example, introduction of a system that uses an IC tag for obtaining information about where a person is, as disclosed in Japanese Patent Unexamined Publication No. 2003-323490.

The system disclosed in the above-mentioned publication is adopted for example in a hospital in order to always know where a patient is. Each patient carries an IC tag which emits an identification code at predetermined intervals, and IC tag readers disposed at various places receive the identification code, to thereby grasp where each patient is.

SUMMARY OF THE INVENTION

By introducing the above-described system into an office, a location of each staff member can be grasped. However, it is likely that no staff member cannot notice a data output in a case where, for example, staff members concentrate on a certain place in an office and the data is outputted from an output terminal, such as a facsimile machine, a printer, etc., that is placed at a distance from the certain place. To be more specific, an output terminal outputs data regardless of whether someone exists therearound or not. Accordingly, for example in a large office in which several output terminals are placed, when data is transmitted to an output terminal around which no one is present, the data is outputted under such a condition, i.e., a condition that no one is present therearound. This may cause a problem that the outputted data is noticed by no staff member and therefore left unattended, a problem that paper jam, paper scattering, etc., occur but are not cleared, and the like. Moreover, if the outputted data is left unattended, data missing, data stealing, or the like can be caused.

An object of the present invention is to provide a server, a data output system, a data output method, and an output terminal, which can prevent that no one notices data outputted by an output terminal.

According to a first aspect of the present invention, a server comprises an electronic data item receiving unit, an identification code receiving unit, an identification code storing unit, and an electronic data item transmitting unit. The electronic data item receiving unit receives an electronic data item. When a person exists within a predetermined range from an output terminal, the identification code receiving unit receives a first identification code concerning any one of the person and a device used by the person and a second identification code for identifying the output terminal. The identification code storing unit stores therein the first and second identification codes received by the identification code receiving unit, in association with each other. The electronic data item transmitting unit transmits the electronic data item received by the electronic data item receiving unit to a corresponding output terminal based on the first and second identification codes stored in the identification code storing unit.

In the first aspect, only when someone exists around an output terminal, an electronic data item is transmitted to the output terminal so that the output terminal outputs the data item. As a consequence, it can be prevented that no one notices output of the data item from the output terminal.

According to a second aspect of the present invention, there is provided a data output system comprising a plurality of output terminals and a server that is data-communicably connected to the output terminals. Each of the output terminals includes a reading unit, an output unit, and an identification code transmitting unit. When a person exists within a predetermined range from the output terminal, the reading unit reads a first identification code concerning any one of the person and a device used by the person. The output unit outputs an electronic data item. The identification code transmitting unit transmits to the server the first identification code read by the reading unit and a second identification code for identifying the output terminal. The server includes an electronic data item receiving unit, an identification code receiving unit, an identification code storing unit, a retrieval unit, and t electronic data item transmitting unit. The electronic data item receiving unit receives the electronic data item. The identification code receiving unit receives the first and second identification codes transmitted by the identification code transmitting unit of any one of the output terminals. The identification code storing unit stores therein the first and second identification codes received by the identification code receiving unit, in association with each other. The retrieval unit retrieves from the identification code storing unit first and second identification codes corresponding to a specific code that specifies a destination of the electronic data item received by the electronic data item receiving unit. The electronic data item transmitting unit transmits the electronic data item received by the electronic data item receiving unit to an output terminal that is assigned the second identification code retrieved by the retrieval unit.

According to a third aspect of the present invention, there is provided a data output method comprising the steps of: receiving an electronic data item; receiving from each of a plurality of output terminals, when a person exists within a predetermined range from the output terminal, a first identification code concerning any one of the person and a device used by the person and a second identification code for identifying the output terminal; storing the first and second identification codes received in the step of receiving identification codes, in association with each other; retrieving, from what has been stored in the step of storing identification codes, first and second identification codes corresponding to a specific code that specifies a destination of the electronic data item received in the step of receiving an electronic data item; and transmitting the electronic data item received in the step of receiving an electronic data item to an output terminal that is assigned the second identification code retrieved in the step of retrieving.

In the second and third aspects, a destination of an electronic data item is specified by a specific code. In this case, first and second identification codes that correspond to this specific code are retrieved from the identification code storing unit, and the electronic data item is transmitted to an output terminal that is assigned the second identification code thus retrieved. Accordingly, an electronic data item addressed to a specific destination can be outputted from an output terminal that is placed near the destination. This can effectively prevent that no one notices output of the data item from the output terminal.

According to a fourth aspect of the present invention, there is provided an output terminal comprising an electronic data item storing unit, a specific code acquiring unit, a reading unit, a determination unit, and an output unit. The electronic data item storing unit stores therein a received electronic data item. Based on the electronic data item stored in the electronic data item storing unit, the specific code acquiring unit acquires a specific code for specifying a destination of the electronic data item. When a person exists within a predetermined range from the output terminal, the reading unit reads a first identification code concerning any one of the person and a device used by the person. The determination unit determines whether the first identification code read by the reading unit corresponds to the specific code acquired by the specific code acquiring unit or not. When the determination unit determines that the first identification code corresponds to the specific code, the output unit outputs the electronic data item stored in the electronic data item storing unit.

In the fourth aspect, a destination of an electronic data item is specified by a specific code. In this case, whether the specific code corresponds to the first identification code read by the reading unit or not is determined. When it is determined that the specific code corresponds to the first identification code, the electronic data item is outputted. Accordingly, an electronic data item addressed to a specific destination can be outputted from an output terminal that is placed near the destination. This can prevent that no one notices output of the data item from the output terminal.

BRIEF DESCRIPTION OF THE DRAWINGS

Other and further objects, features and advantages of the invention will appear more fully from the following description taken in connection with the accompanying drawings in which:

FIG. 3 shows an in-room person data table that is stored in the server;

DESCRIPTION OF THE PREFERRED EMBODIMENTS

In the following, a certain preferred embodiment of the present invention will be described with reference to the accompanying drawings.

Figure 1:
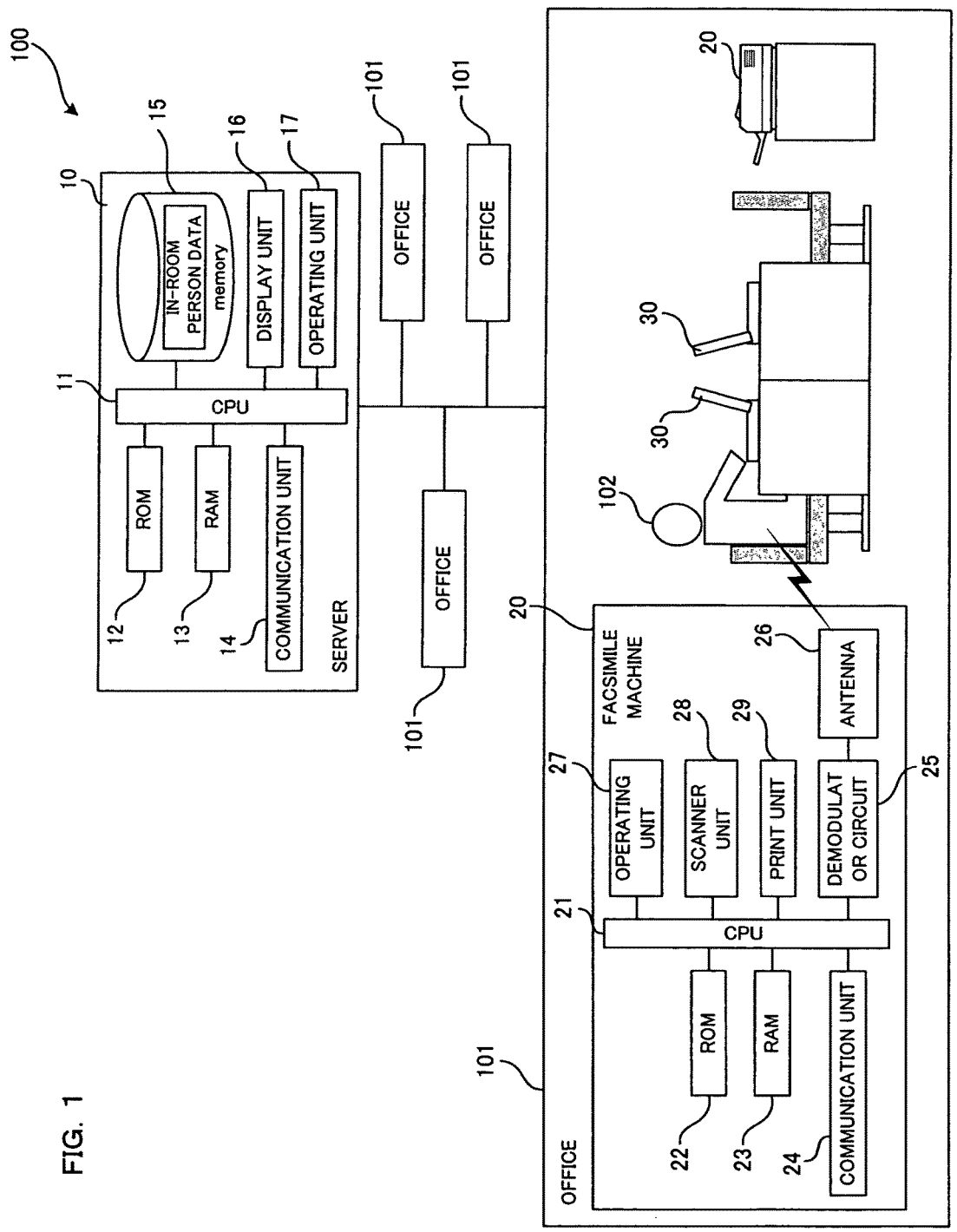
FIG. 1 schematically illustrates a construction of a data output system that includes a server according to an embodiment of the present invention.

First, with reference to FIG. 1, a description will be given to a server 10 and a data output system 100 that includes the server 10 according to an embodiment of the present invention. As shown in FIG. 1, the data output system 100 includes facsimile machines 20 (only one of which is shown in FIG. 1) functioning as output terminals and placed in respective offices 101, and the server 10 that is data-communicably connected to the respective facsimile machines 20 with or without a wire. Also, many personal computers 30 are placed in each office 101. Each of the personal computers 30 is data-communicably connected to a facsimile machine 20 nearby with or without a wire. Two or more of the personal computers 30 are connected to one facsimile machine 20.

Figure 2:
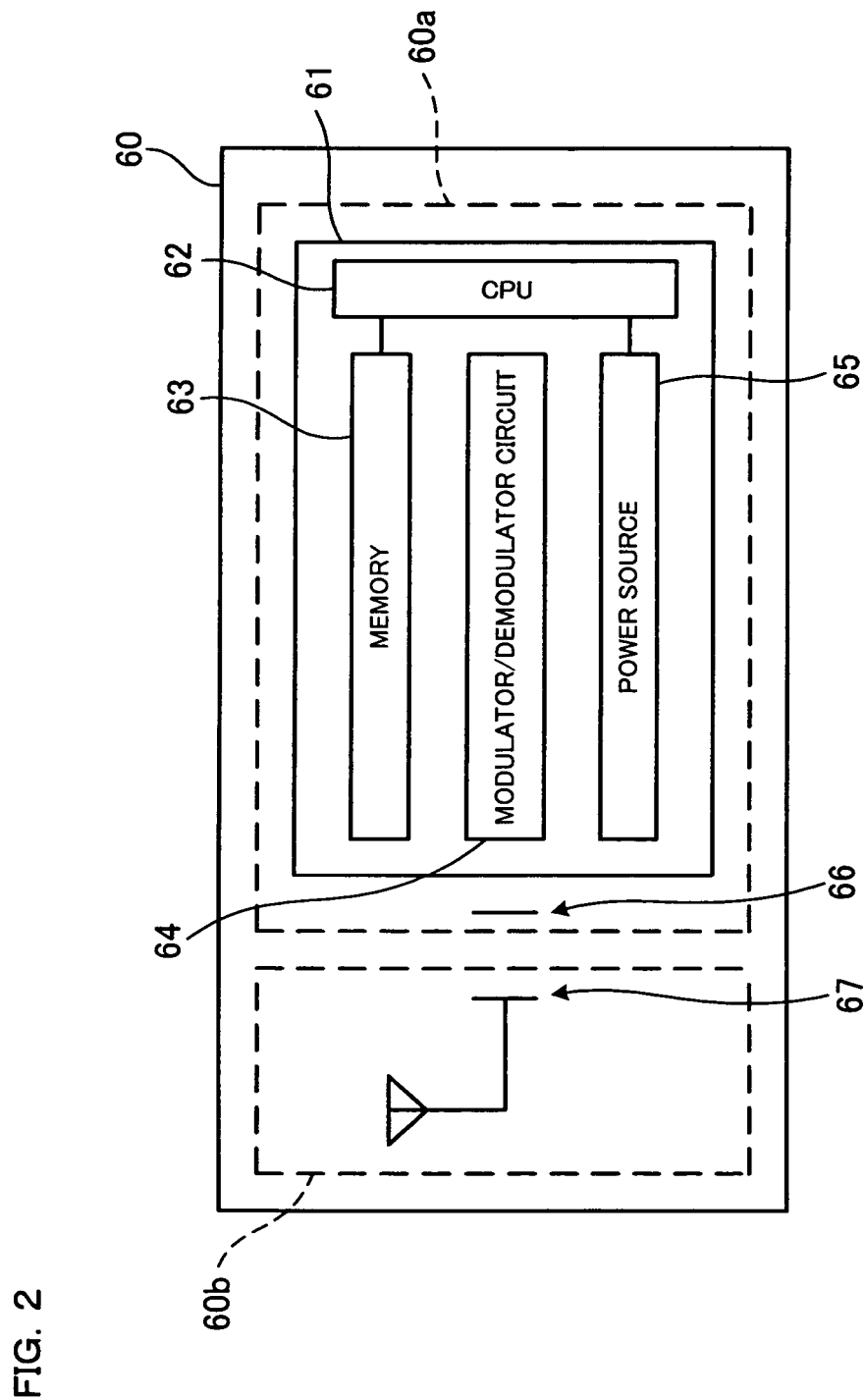
FIG. 2 is a block diagram showing an electrical construction of an IC card that is carried around by each staff member.

The office 101 has introduced a so-called free spacing, and a staff member 102 working at each office 101 does not have his/her own seat. The staff member 102 always carries an IC card 60 (see FIG. 2), and freely uses an empty seat to work thereat. As shown in FIG. 2, the IC card 60 has an IC main body 60a and a mounted body 60b that is removably mounted to the IC main body 60a.

The IC main body 60a has an IC chip 61 and an antenna 66 for wireless communication. Through the antenna 66, the IC main body 60a communicates data with the facsimile machine 20 and the personal computer 30. The IC chip 61 includes a CPU 62, a memory 63, a modulator/demodulator circuit 64, and a power source 65. The memory 63 is electrically writable and erasable, and stores therein a staff identification code which is specific to each individual IC card 60. The staff identification code is composed of a 4-digit number (see FIG. 3). The modulator/demodulator circuit 64 modulates and demodulates data that is transmitted or received through the antenna 66. The power source 65 supplies power to the CPU 62 and the modulator/demodulator circuit 64. Since the power source 65 is provided in the IC main body 60a, the IC main body 60a is able to emit a weak radio wave by itself.

The IC main body 60a emits at predetermined intervals an automatic signal carrying the staff identification code. The automatic signal is received by a facsimile machine 20 that is placed within a communication coverage of this signal. Also, as will be described later, when a staff member 102 who carries the IC card 60 including the IC main body 60a powers up a personal computer 30, the personal computer 30 transmits an interrogation signal. Upon reception of this interrogation signal, the IC main body 60a emits a response signal carrying the staff identification code. The response signal is received by the personal computer 30 that has transmitted the interrogation signal.

The mounted body 60b has a sub antenna 67 that is adapted to a frequency band different from a frequency band to which the antenna 66 of the IC main body 60a is adapted. Each of the antenna 66 and the sub antenna 67 is a so-called dipole antenna including a flat-plate conductor. The mounted body 60b is mounted to the IC main body 60a in such a manner that the conductor of the antenna 66 and the conductor of the sub antenna 67 are separated away from each other and at least partly confront each other. This makes the antenna 66 and the sub antenna 67 function like electrode plates of a capacitor, so that a signal received by the sub antenna 67 is supplied from the sub antenna 67 through the antenna 66 to the IC chip 61.

When an interrogation signal transmitted from a personal computer 30 is in a frequency band that is different from a frequency band to which the antenna 66 is adapted, the IC main body 60a cannot receive this interrogation signal. However, when the interrogation signal corresponds to a frequency band to which the sub antenna 67 of the mounted body 60b is adapted, the interrogation signal is received by the mounted body 60b and transmitted to the IC main body 60a. Accordingly, presence of the mounted body 60b enables the IC card 60 to receive a signal in broader frequency band as compared with when the IC card 60 has the IC main body 60a alone.

As shown in FIG. 1, each facsimile machine 20 includes a CPU 21, a ROM 22, a RAM 23, a communication unit 24, a demodulator circuit 25, an antenna 26, an operating unit 27, a scanner unit 28, and a print unit 29.

The ROM 22 stores therein a program executed by the CPU 21, a fax identification code which is specific to each individual facsimile machine 20, and the like. The RAM 23 stores therein various data. The communication unit 24 implements data communication with the server 10 and with the personal computer 30. The antenna 26 receives an automatic signal that is emitted at predetermined intervals from an IC card 60 carried around by a staff member 102 existing within a predetermined range. Here, the predetermined range means a communication coverage of the automatic signal. The demodulator circuit 25 demodulates data that is received through the antenna 26. The antenna 26 and the demodulator circuit 25 function as a reading unit of the present invention. The operating unit 27 is operated by a user of the facsimile machine 20. The scanner unit 28 reads a document or the like, and converts it into image data. The print unit 29, which functions as an output unit of the present invention, performs printing based on fax data received through the communication unit 24 from the server 10.

Through the communication unit 24, the facsimile machine 20 transmits and receives fax data to/from the server 10. The fax data includes image data after conversion by the scanner unit 28, and a specific code that specifies a destination of the fax data. The specific code corresponds to a staff identification code.

It may be possible that, when transmitting fax data, a user of the facsimile machine 20 inputs a specific code through the operating unit 27. More specifically, it may be possible to, after a user of the facsimile machine 20 inputs a fax number to thereby access a communication line, provide a guidance according to which the user inputs a specific code. Alternatively, it may also be possible that the scanner unit 28 reads a document on which a specific code is written. The specific code can be set appropriately. For example, in a case where the communication line is an intra-office line, the specific code may be a staff member number, a name of a staff member 102, etc.

Each personal computer 30 has a memory (not shown) and a reader (not shown). The memory stores therein a PC identification code which is specific to each individual personal computer 30. The reader contactlessly reads a staff identification code out of an IC card 60 carried around by a staff member 102. The reader has an antenna and a modulator/demodulator circuit. The modulator/demodulator circuit modulates and demodulates a response signal received through the antenna.

As shown in FIG. 1, the server 10 has a CPU 11, a ROM 12, a RAM 13, a communication unit 14, a memory 15, a display unit 16, and an operating unit 17 such as a keyboard. The ROM 12 stores therein a program executed by the CPU 11, and the like. The communication unit 14 implements data communication with the facsimile machines 20 and an external network. The RAM 13 stores therein fax data received through the communication unit 14 from the facsimile machine 20 or the external network, and the like.

Every time the server 10 receives a staff identification code and a fax identification code through the communication unit 14 from any of the facsimile machines 20, the server 10 creates or updates in-room person data. The in-room person data is, in the form of a data table associating each staff identification code with a fax identification code, stored in the memory 15 (see FIG. 3). The server 10 refers to an in-room person data table stored in the memory 15, to know around which facsimile machine 20 within the office 101 each staff member 102 currently stays. Based on the in-room person data table, the server 10 transmits received fax data to a corresponding facsimile machine 20.

The memory 15 stores therein, in addition to the in-room person data table, a fax position data table associating each fax identification code with data about where a facsimile machine 20 having this fax identification code is placed, and the like. The server 10 refers to the in-room person data table and the fax position data table, to roughly know where each staff member 102 currently stays.

Figure 4:
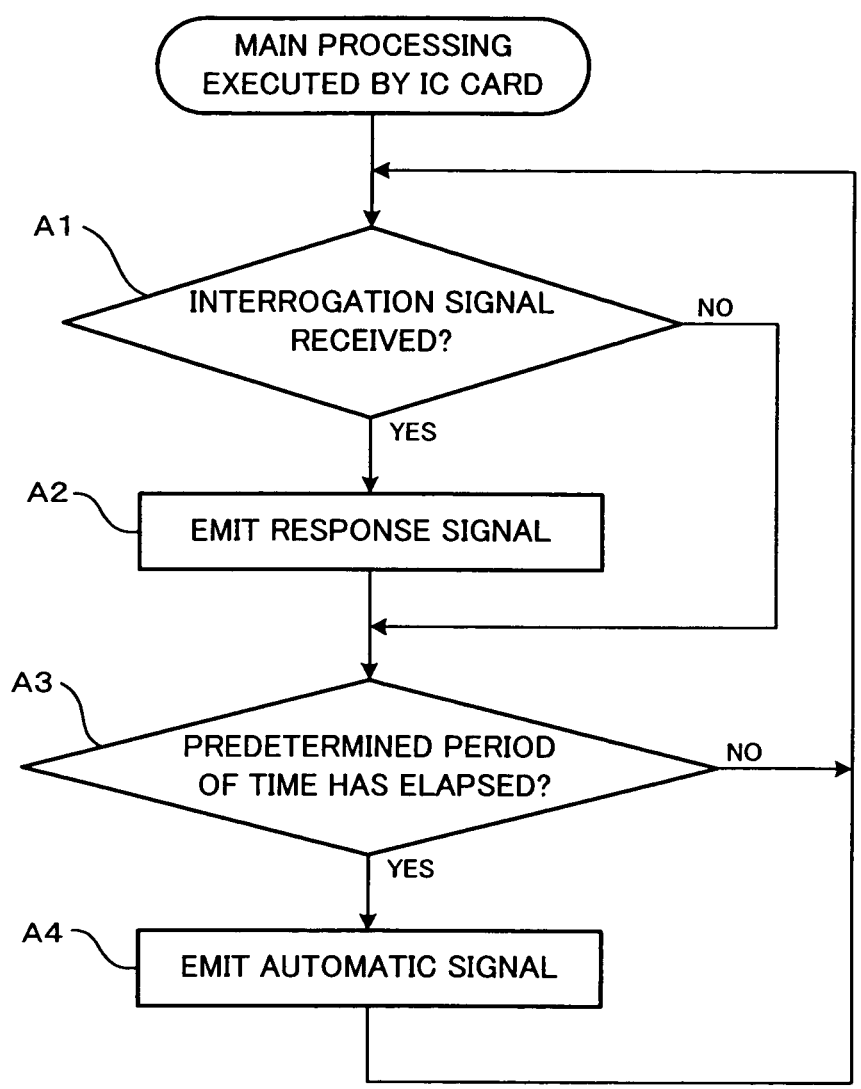
FIG. 4 is a flowchart showing a main processing that is executed by the IC card.

Next, a main processing that is executed by the CPU 62 of the IC card 60 will be described with reference to FIG. 4.

First, the CPU 62 determines whether an interrogation signal is received from a personal computer 30 or not (A1). When an interrogation signal is received from a personal computer 30 (A1: YES), the CPU 62 emits a response signal that carries a staff identification code stored in the memory 63 (A2). Then, the processing proceeds to A3. The response signal emitted in A2 is received by the personal computer 30 that has transmitted the interrogation signal. When an interrogation signal is not received from a personal computer 30 (A1: NO), the processing skips A2 and proceeds to A3.

In A3, the CPU 62 determines whether a predetermined period of time has elapsed since it emitted the previous automatic signal or not. When the predetermined period of time has elapsed (A3: YES), the CPU 62 emits an automatic signal that carries the staff identification code stored in the memory 63 (A4). Then, the processing returns to A1. When the predetermined period of time has not elapsed (A3: NO), the processing returns to A1 without performing A4.

Figure 5:
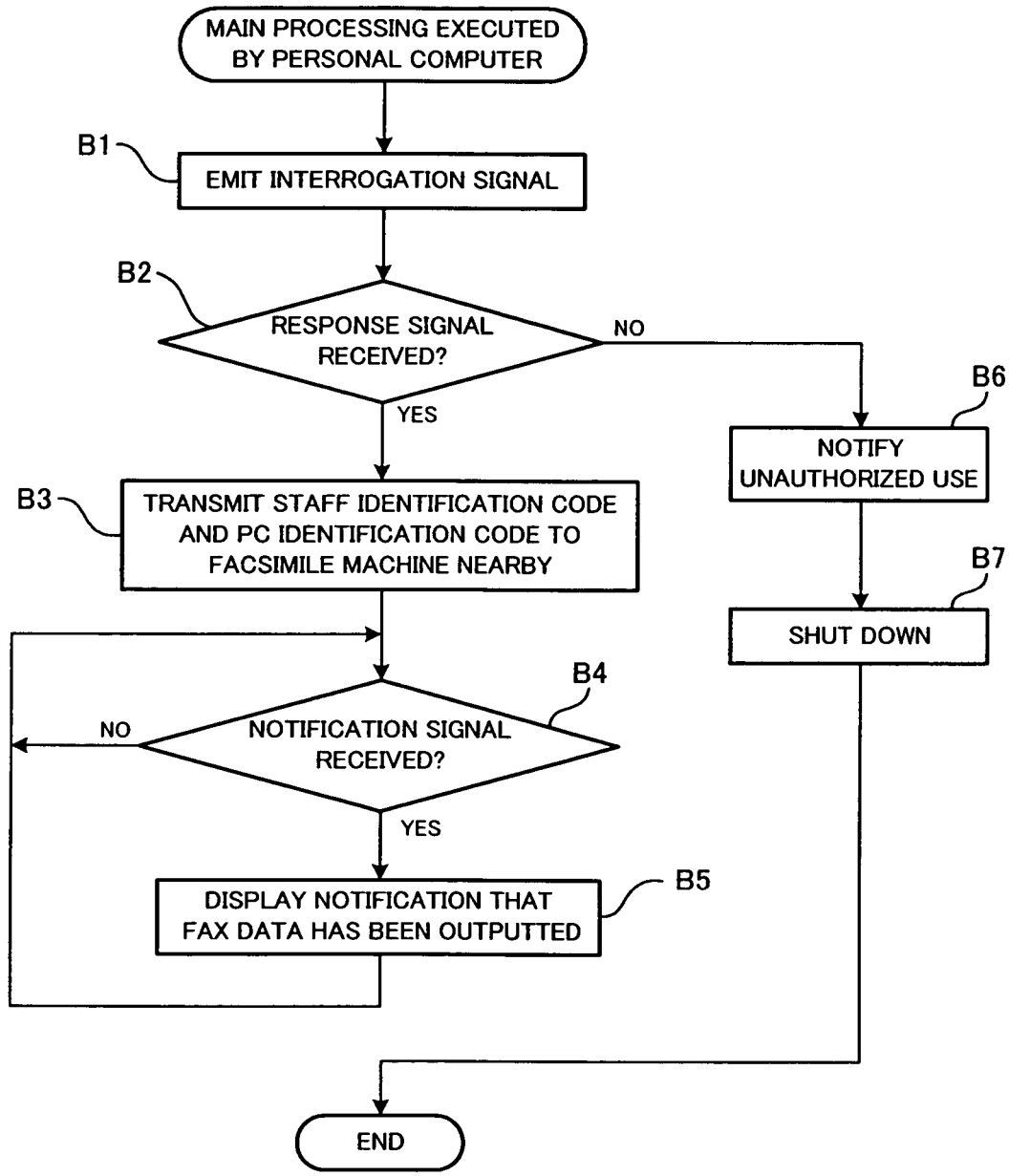
FIG. 5 is a flowchart showing a main processing that is executed by a personal computer.

Next, a main processing that is executed by the CPU of the personal computer 30 will be described with reference to FIG. 5. This main processing is started upon a powerup of the personal computer 30.

First, the CPU emits an interrogation signal (B1). The interrogation signal is received by an IC card 60 carried around by a staff member 102 who has powered up the personal computer 30. In response to the interrogation signal, the IC card 60 emits a response signal (A2 of FIG. 4). The CPU of the personal computer 30 determines whether the response signal is received or not (B2). When the response signal is received (B2: YES), the reader of the personal computer 30 reads a staff identification code included in the response signal, and then transmits the staff identification code and a PC identification code stored in the memory of the personal computer 30, to a facsimile machine 20 nearby that is data-communicably connected to this personal computer 30 (B3).

Then, the CPU determines whether a later-described notification signal is received from the facsimile machine 20 or not (B4). When the notification signal is not received (B4: NO), the processing repeats B4. When the notification signal is received (B4: YES), a notification that fax data have been outputted is shown on the display of the personal computer 30 (B5). Then, the processing returns to B4, and repeats B4 and B5. This routine ends when the personal computer 30 is powered down.

When the response signal is not received (B2: NO), the CPU determines that a person who has powered up the personal computer 30 is a stranger carrying no IC card 60, and therefore notifies an unauthorized use (B6). This notification may be made either through the display of the personal computer 30 and through a speaker of the personal computer 30 as a sound output. Then, the personal computer 30 is forcibly shut down (B7), and the processing exits from this routine. That is, when a person who has powered up the personal computer 30 carries no IC card 60, the personal computer 30 is not allowed to be used.

Next, a main processing that is executed by the CPU 21 of the facsimile machine 20 will be described with reference to FIG. 6.

First, the CPU 21 determines whether a staff identification code and a PC identification code are received from any of personal computers 30 that are data-communicably connected to this facsimile machine 20 or not (C1). When a staff identification code and a PC identification code are not received (C1: NO), the processing proceeds to C3. When a staff identification code and a PC identification code are received (C1: YES), the received staff identification code and PC identification code are associated with each other and stored into the RAM 23 (C2). Then, the processing returns to C1. When two or more personal computers 30 that are data-communicably connected to the facsimile machine 20 are in use by staff members 102, two or more staff identification codes are respectively associated with PC identification codes, and stored into the RAM 23.

In C3, the CPU 21 determines whether an automatic signal is received from any of IC cards 60 that are carried around by staff members 102 existing within a predetermined range or not (C3). When an automatic signal is received (C3: YES), the CPU 21 reads a staff identification code included in the automatic signal (C4). Then, the CPU 21 transmits to the server 10 the staff identification code read in C4 and the fax identification code stored in the ROM 22 (C5) Thereafter, the processing returns to C1.

When an automatic signal is not received (C3: NO), then the CPU 21 determines whether fax data is received from the server 10 or not (C6). When fax data is not received (C6: NO), the processing returns to C1.

When fax data is received (C6: YES), the CPU 21 identifies a personal computer 30 that is used by a staff member 102 to whom the fax data is addressed (C7). To be more specific, the CPU 21 acquires a specific code included in the fax data, then retrieves from the RAM 23 a staff identification code corresponding to the acquired specific code, and further retrieves from the RAM 23 a PC identification code associated with the retrieved staff identification code. Based on the PC identification code, the CPU 21 identifies the personal computer 30. Then, the CPU 21 outputs image data included in the fax data, through the print unit 29 (C8)

After C8, the CPU 21 transmits a notification signal for notifying that the fax data have been outputted, to the personal computer 30 identified in C7 (C9). This notification may be made, for example, through an electronic mail using the PC identification code as an e-mail address, or through any other means. After C9, the processing returns to C1.

Next, a main processing that is executed by the CPU 11 of the server 10 will be described with reference to FIG. 7.

First, the CPU 11 determines whether a staff identification code and a fax identification code are received from any of the facsimile machines 20 that are data-communicably connected to the server 10, or not (D1). When a staff identification code and a fax identification code are received (D1: YES), the in-room data table shown in FIG. 3 is updated (D2). More specifically, the server 10 determines whether the staff identification code received from a facsimile machine 20 is registered in the in-room person data table or not. When it is registered, the server 10 rewrites the stored fax identification code associated with the received staff identification code into the received fax identification code. When it is not registered, the server 10 associates the received staff identification code and fax identification code with each other, and newly registers them in the in-room person data table.

After the in-room person data table is updated in D2, or when a staff identification code and a fax identification code are not received (D1: NO), the server 10 determines whether fax data is received from any of the facsimile machines 20 or the external network connected to the server 10, or not (D3). When fax data is not received (D3: NO), the processing returns to D1.

When fax data is received (D3: YES), the CPU 11 retrieves from the in-room person data table a staff identification code corresponding to a specific code included in the fax data (D4). The CPU 11 further retrieves from the in-room person data table a fax identification code associated with the retrieved staff identification code (D5). Then, the CPU 11 transmits the fax data to a facsimile machine 20 that is assigned the retrieved fax identification code (D6). After D6, the processing returns to D1, and repeats the above-described steps.

As thus far described above, when receiving from any of the facsimile machines 20 a staff identification code of a staff member 102 existing around the facsimile machine 20 and a fax identification code of the facsimile machine 20 (D1: YES), the server 10 of this embodiment associates the received staff identification code and fax identification code with each other, and stores them (D2) Based on the staff identification code and the fax identification code thus stored, fax data received by the server 10 is transmitted to a corresponding facsimile machine (D6). Therefore, only when any staff member 102, which in this embodiment means a staff member 102 to whom fax data is addressed, exists around a facsimile machine 20, the fax data is transmitted to the facsimile machine 20 so that the fax data is outputted therefrom. As a consequence, it can be prevented that no one notices data output from the facsimile machine 20. That is, it can be ensured that data outputted from the facsimile machine 20 is received by any staff member 102 existing around the facsimile machine 20. In addition, it can be prevented that data outputted from the facsimile machine 20 is left unattended, or that paper jam, paper scattering, etc., occur in the facsimile machine 20 but are not cleared.

In this embodiment, moreover, a destination of fax data is specified by a specific code. In this case, a staff identification code and a fax identification code corresponding to this specific code are retrieved from the in-room person data table (D4 and D5), and the fax data is transmitted to a facsimile machine 20 assigned the fax identification code thus retrieved (D6). Accordingly, the fax data addressed to a specific destination can be outputted from the facsimile machine 20 that is placed near a destination staff member 102. This can more surely prevent that no one notices data output from the facsimile machine 20. Besides, even though a sender of fax data does not know where a destination person is, the sender can, by inputting for example a name of the destination person as a specific code at the time of fax transmission, output the fax data from a facsimile machine 20 that is placed near the destination staff member 102.

Each facsimile machine 20 has a reading unit that reads a staff identification code out of the IC card 60. The reading unit includes the demodulator circuit 25 and the antenna 26. A staff identification code and a fax identification code outputted from each facsimile machine 20 are received by the server 10. In this case, as compared with in a case where the reading unit is not provided in each facsimile machine 20 but provided for example at an entrance to each office 101, the server 10 can find a facsimile machine 20 that is placed closer to a destination staff member 102. Since data is outputted from the facsimile machine 20 placed closer to the destination staff member 102, this destination staff member 102 can surely receive the data.

An IC card 60, which can be carried around by each staff member 102, is provided therein with an IC chip 61 in which a staff identification code for identifying the staff member 102 is stored. A facsimile machine 20 that is placed within a predetermined range from the IC card 60 receives an automatic signal carrying the staff identification code from the IC card 60, and then transmits to the server 10 the staff identification code and a fax identification code assigned to the facsimile machine 20. Consequently, based on the fax identification code and the staff identification code thus received, the server 10 knows where each staff member 102 currently exists, to be more specific, around which facsimile machine 20 each staff member 102 currently exists. Therefore, particularly when fax data is addressed to a specific destination, the server 10 outputs the fax data from a facsimile machine 20 that is placed near the destination staff member 102 so that the fax data can surely reach the destination staff member 102.

Next, modifications will be described.

A modification of the main processing that is executed by the server 10 will be described with reference to FIG. 8. In FIG. 8, the same steps as those in FIG. 7 are denoted by the common reference numerals, and a specific description thereof will be omitted.

Figure 6:
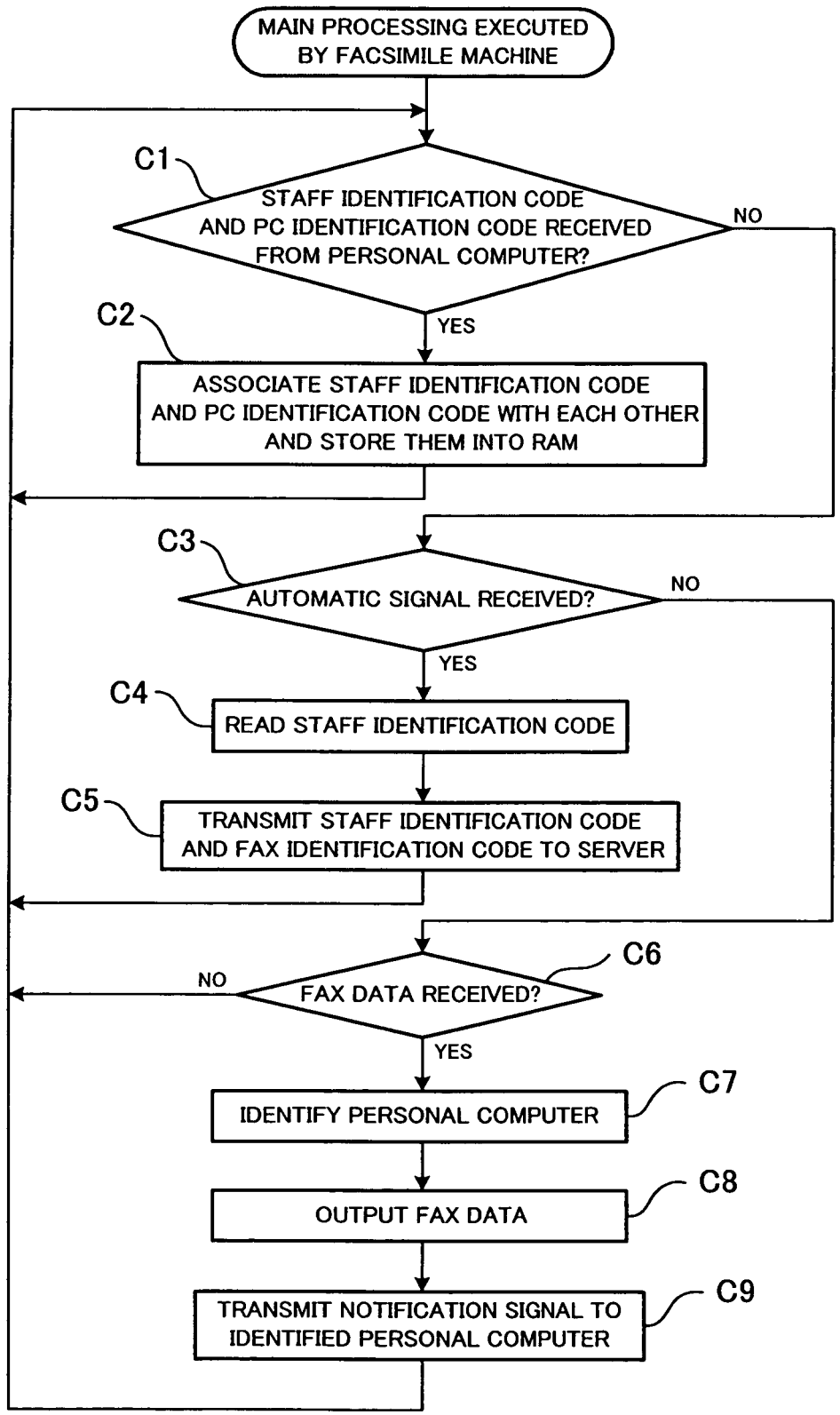
FIG. 6 is a flowchart showing a main processing that is executed by a facsimile machine.

In this modification, in the step of C5 of FIG. 6, each facsimile machine 20 transmits to the server 10 not only a staff identification code and a fax identification code but also a PC identification code of a personal computer 30 used by a staff member 102 who is assigned the staff identification code. The facsimile machine 20 extracts the PC identification code from the RAM 23. The in-room person data is stored in the storage 15, in the form of a data table associating a staff identification code, a PC identification code, and a fax identification code with one another.

The CPU 11 of the server 10 firstly determines whether a staff identification code, a PC identification code, and a fax identification code are received from any of the facsimile machines 20 that are data-communicably connected to the server 10, or not (D10). When a staff identification code, a PC identification code, and a fax identification code are received (D10: YES), the in-room person data table is updated (D11). In D11 of this modification, the server 10 determines whether the staff identification code received from a facsimile machine 20 is registered in the in-room person data table or not. When it is registered, the server 10 rewrites the. PC identification code and fax identification code associated with the received staff identification code into the received PC identification code and fax identification code. When it is not registered, the server 10 associates the received staff identification code, PC identification code, and fax identification code with one another, and newly registers them in the in-room person data table.

D3 is the same as described above. When fax data is received (D3: YES), the server 10 determines whether the fax data is addressed to a specific destination or not (D12). When the fax data is addressed to a specific destination (D12: YES), the processing proceeds to D4 to D6, which are the same steps as described above.

When the fax data is not addressed to a specific destination (D12: NO), the server 10 retrieves from the in-room person data table a fax identification code that is associated with an authentic staff identification code (D13). To be more specific, the server 10 compares each staff identification code stored in the in-room person data table with a prestored authentic staff identification code, and extracts only the authentic staff identification codes. Then, the server 10 extracts fax identification codes associated with the authentic staff identification codes. After D13, the server 10 transmits the fax data to facsimile machines 20 that are respectively assigned the extracted fax identification codes (D6).

D6 is followed by D14, in which the server 10 transmits a notification signal for notifying that the fax data have been outputted, to personal computers 30 that are assigned PC identification codes associated with the staff identification codes retrieved in D4 or associated with the staff identification codes extracted as the authentic staff identification codes in D13.

In the server 10 of this modification, the processing goes through D12 and D13 so that fax data is transmitted only to a facsimile machine 20 around which an authentic staff member 102 exists. This can prevent an unauthentic person from receiving information that is intended only for an authentic staff member 102, such as company's confidential information.

After transmitting the fax data, the server 10 transmits the notification signal for notifying that the fax data have been outputted, to the personal computer 30 that is used by the destination staff member 102 (D14). The staff member 102 to which the fax data is addressed is alerted thereby. Therefore, it can more surely be prevented that data outputted from the facsimile machine 20 is left unattended, or that paper jam, paper scattering, etc., occur in the facsimile machine 20 but are not cleared.

Figure 9:
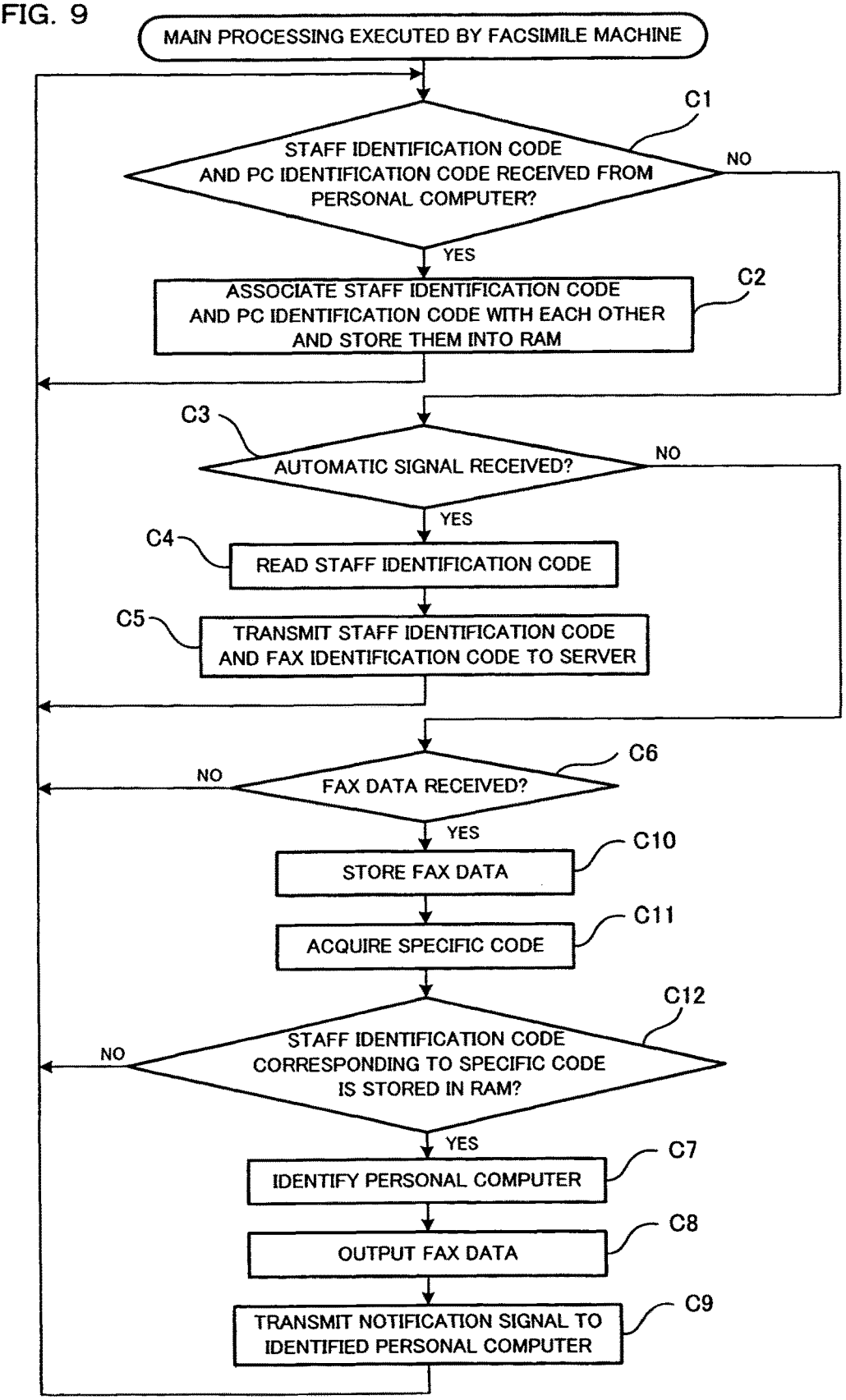
FIG. 9 is a flowchart showing a modification of the main processing that is executed by the facsimile machine.

Next, a modification of the main processing that is executed by the facsimile machine 20 will be described with reference to FIG. 9. In FIG. 9, the same steps as those in FIG. 6 are denoted by the common reference numerals, and a specific description thereof will be omitted.

Figure 7:
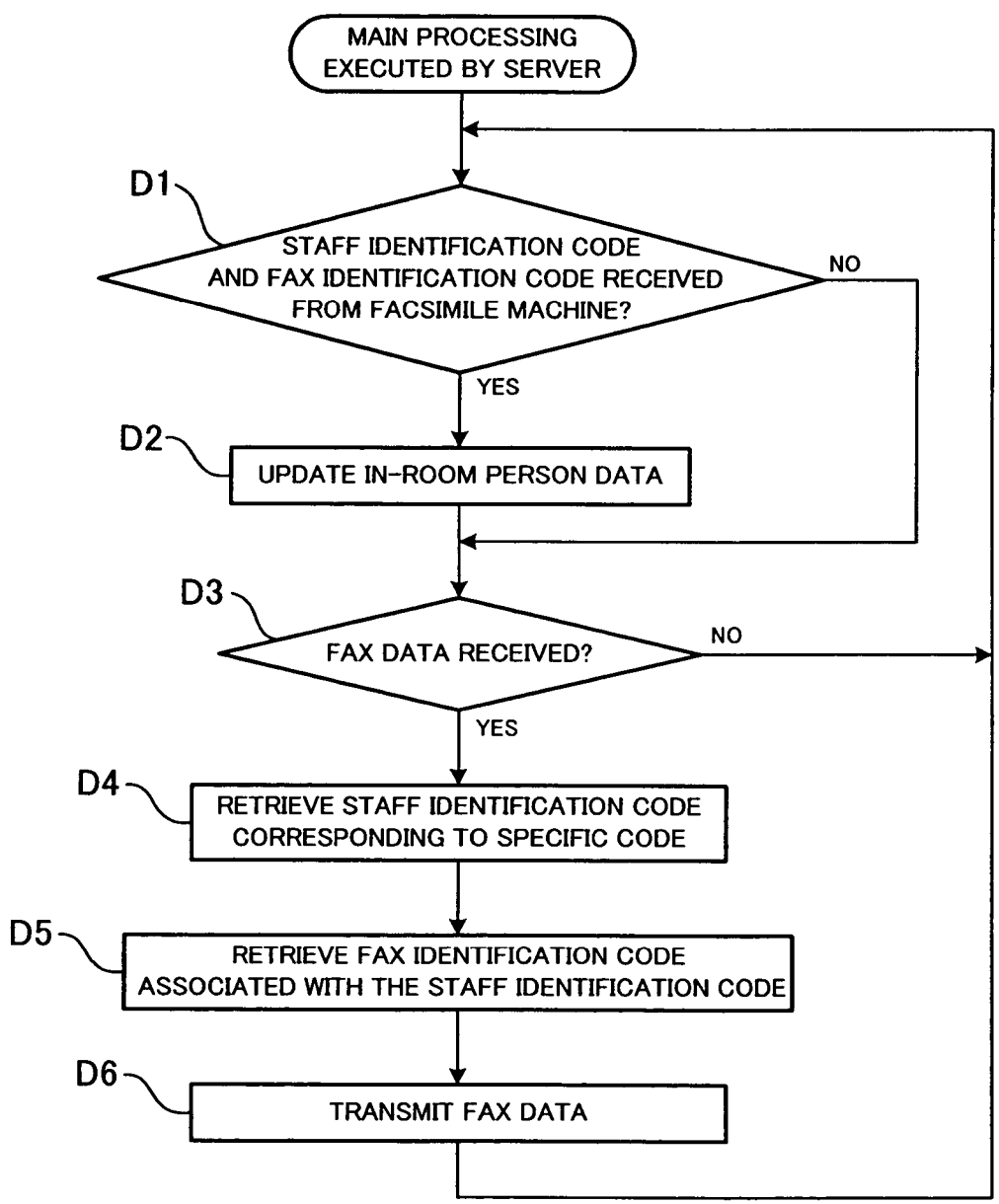
FIG. 7 is a flowchart showing a main processing that is executed by the server.
Figure 8:
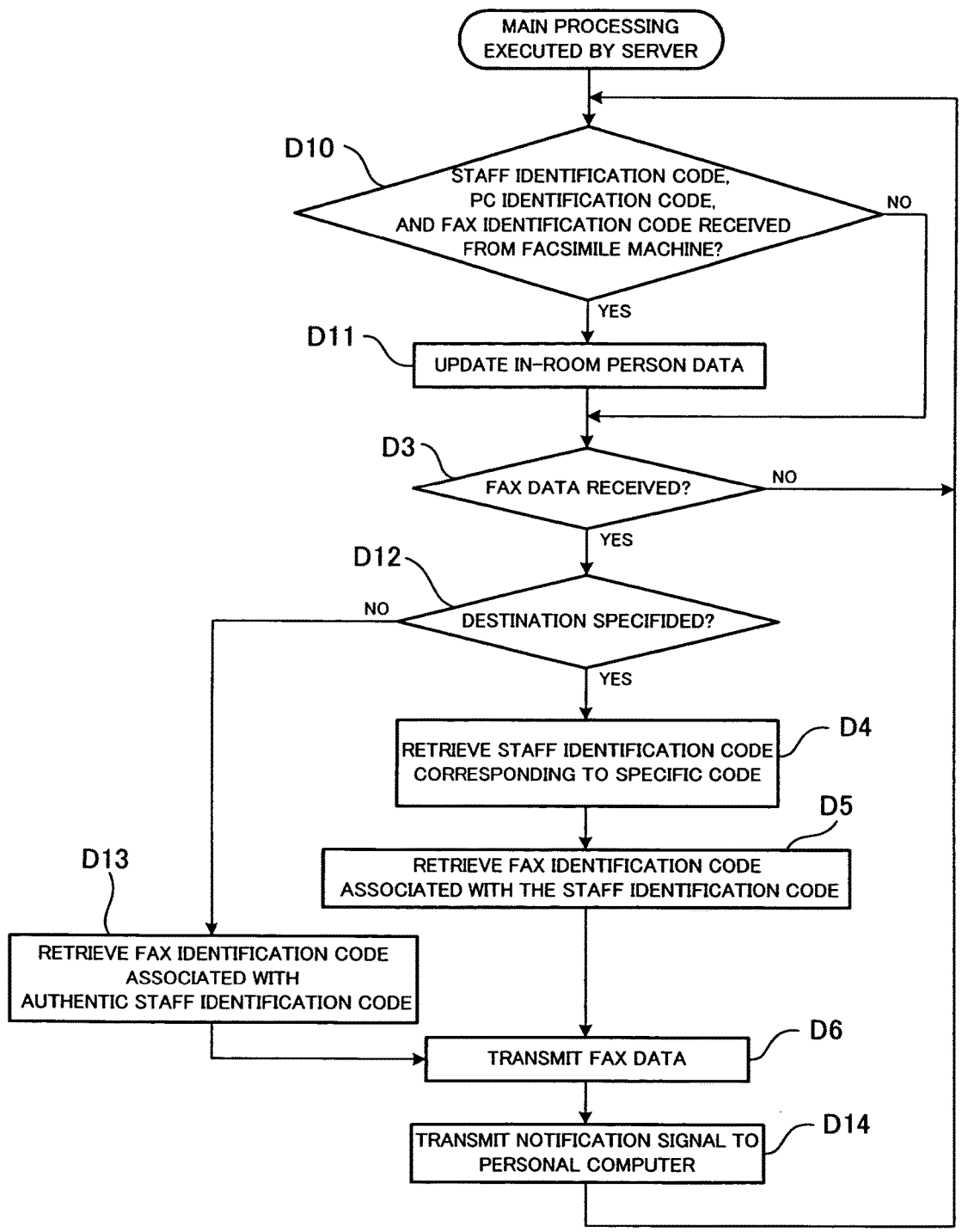
FIG. 8 is a flowchart showing a modification of the main processing that is executed by the server.

In this modification, the server 10 does not perform D4 and D5 of FIG. 7, or D12, D13, D4, and D5 of FIG. 8. Instead, when receiving fax data (D3: YES), the server 10 transmits the fax data to all of facsimile machines 20 that are connected to the server 10.

When receiving fax data (C6: YES), the CPU 21 of the facsimile machine 20 stores the fax data into the RAM 23 (C10). Then, the CPU 21 acquires a specific code from the received fax data (C11), and determines whether a staff identification code corresponding to the specific code is stored in the RAM 23 or not (C12). When the staff identification code corresponding to the specific code is stored in the RAM 23 (C12: YES), the processing proceeds to C7 to C9 which are the same steps as in the above-described embodiment.

When the staff identification code corresponding to the specific code is not stored in the RAM 23 (C12: NO), the CPU 21 does not output the fax data and returns to C1. In this case, the fax data will be outputted from another facsimile machine 20 that has a RAM 23 in which the staff identification code corresponding to the specific code is stored.

In this modification, the facsimile machine 20 determines whether a specific code that specifies a destination address of the fax data corresponds to any of the staff identification codes stored in the RAM 23 or not (C12). When it is determined that the specific code corresponds to a certain staff identification code stored in the RAM 23 (C12: YES), the fax data is outputted (C8). As a result, the fax data addressed to a specific destination can be outputted from a facsimile machine 20 that is placed near the destination, which can prevent that no one notices data output from the facsimile machine 20.

After outputting the fax data, the facsimile machine 20 transmits a notification signal for notifying that the fax data have been outputted, to a personal computer 30 that is used by a staff member 102 to which the fax data is addressed (C9). The staff member 102 to which the fax data is addressed is alerted thereby. Therefore, it can more surely be prevented that data outputted from the facsimile machine 20 is left unattended, or that paper jam, paper scattering, etc., occur in the facsimile machine 20 but are not cleared.

Electronic data which is transmitted from the server 10 to a facsimile machine 20 and outputted from the facsimile machine 20 is not limited to image data, but may be sound data, one including both of image data and sound data, or the like.

A destination of an electronic data item may either be specified and not-specified by a specific code. That is, an electronic data item may be transmitted either to an individual and to many unspecified people, e.g., to all staff members 102 of a company. In addition, a destination is not limited to an individual person such as a staff member 102, but may be a device such as a personal computer 30. In this case, the specific code may correspond to the PC identification code instead of the staff identification code.

The staff identification code, the fax identification code, and the PC identification code may take various forms. They may be figures, alphabets, or a combination of the both.

The mounted body 60b of the IC card 60 may not necessarily be mounted to the IC main body 60a. For example, it may be possible that the mounted body 60b has a shape of casing that receives the IC main body 60a.

The IC card 60 may have the IC main body 60a alone without the mounted body 60b.

The IC chip 61 may be provided on, instead of the IC card 60, a portable phone, a personal handyphone system, or the like.

The notification signal may be transmitted to a portable phone, a personal handyphone system, or the like, carried around by a staff member 102. This enables data output to be notified even while the staff member 102 is moving.

The reading unit that reads a staff identification code out of the IC card 60 may not necessarily be, like the reading unit of the above-described embodiment including the demodulator circuit 25 and the antenna 26, provided in each facsimile machine 20. Alternatively, the reading unit may be placed near or away from the facsimile machine 20. In the above embodiment for example, even though each facsimile machine 20 does not have the reading unit, the personal computer 30 receives a staff identification code from an IC card 60, and transmits the staff identification code and its PC identification code to the facsimile machine 20 (B3). Thereby, the facsimile machine 20 can acquire the staff identification code of a staff who exists around itself.

Alternatively, it may also be possible that, in a case where each office 101 is small and therefore has a single facsimile machine 20 placed therein, the reading unit is not provided in the facsimile machine 20 but at an entrance to each office 101. Consequently, a staff member 102 entering an office 101 can be found earlier, and in addition it can be prevented that no one notices data output from the facsimile machine 20 because fax data is transmitted to the facsimile machine 20 that is placed in an office 101 where a staff member 102 exists. Further, in a case where a destination of fax data is a staff member 102 who has entered the office 101, the fax data is transmitted to the facsimile machine 20 that is placed in the office 101 so that the destination staff member 102 can receive the data.

In the above-described embodiment, the IC chip 61 storing therein a staff identification code for identifying a staff member 102 is provided in the IC card 60 which can be carried abound by each staff member 102. However, this is not limitative. For example, it may be possible that an IC chip storing therein a PC identification code for identifying a personal computer 30 is provided in each personal computer 30. Thus, at the time when a staff member 102 powers up a personal computer 30, the personal computer 30 emits a signal carrying its PC identification code. A facsimile machine 20 that is placed near the personal computer 30 receives this signal, reads the PC identification code included in this signal, and transmits the PC identification code to the server 10. In this case as well, the server 10 can know that someone, which means the staff member 102 who has powered up the personal computer 30, exists around the facsimile machine 20. Accordingly, it can be prevented that no one notices data output from the facsimile machine 20. For example, in order to give all staff members 102 information such as a message, the information can be given by outputting data from facsimile machines 20 around which someone exists. Besides, in order to inform a user of a personal computer 30 of a disorder or a notice concerning the personal computer 30, information is outputted from a facsimile machine 20 that is placed near the personal computer 30 at the time when the personal computer 30 is powered up. The user of the personal computer 30 can thereby get the information.

The output terminal is not limited to the facsimile machine 20, but may be a printer, a personal computer, a telephone, or the like. When for example the personal computer 30 is employed as an output terminal, it may be possible that the personal computer 30 transmits a staff identification code and a PC identification code to the server 10 and the server 10 stores therein a table associating the staff identification code with the PC identification code. With reference to this table, the server 10 may, when receiving electronic data such as an electronic mail, transmit the electronic data to a corresponding personal computer 30. Alternatively, it may also be possible that the server 10 transmits received data to all personal computers 30 that are connected to the server 10, and each of the personal computers 30 determines whether a staff identification code of a staff member 102 who is using the personal computer 30 corresponds to a specific code that specifies a destination of the electronic data or not. When the staff identification code corresponds to the specific code, the personal computer outputs the electronic data.

In the above-described embodiment, in a case where a person who has powered up a personal computer 30 does not carry an IC card 60, the personal computer 30 cannot be used. However, it may be possible to make the personal computer 30 available to a person carrying no IC card 60.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A data output system comprising a plurality of output terminals and a server that is data-communicably connected to the output terminals,
    wherein each of the output terminals includes
        an antenna that, when an IC chip storing an identification code is within a predetermined range, reads the identification code from the IC chip,
        an output unit that outputs an electronic data received from the server, and
        a transmitting unit that transmits to the server the identification code read by the antenna and a terminal identification code for identifying an output terminal corresponding to the antenna having read the identification code among the output terminals; and
    wherein the server includes
        an electronic data receiving unit that receives the electronic data and a specific code for specifying a destination of the electronic data,
        a code receiving unit that receives the identification code and the terminal identification code transmitted by the output terminal, and
        a processing unit that determines whether the specific code received by the electronic data receiving unit corresponds to the identification code received by the code receiving unit, and transmits the electronic data to the output terminal corresponding to the terminal identification code among the output terminals when determining that the specific code corresponds to the identification code.

2. The data output system according to claim 1, wherein the predetermined range is communication coverage of the IC chip.

3. The data output system according to claim 1, wherein the output terminal includes a facsimile machine.

4. The data output system according to claim 1, wherein the IC chip is provided on an IC card.

5. The data output system according to claim 1, wherein the transmitting unit, after the output unit outputs the electronic data, transmits a notification signal for notifying that the electronic data has been outputted, to a person using the output terminal outputting the electronic data.

6. The data output system according to claim 1, wherein the transmitting unit, after the output unit outputs the electronic data, transmits through an electronic mail a notification signal for notifying that the electronic data has been outputted, to a person using the output terminal outputting the electronic data.

7. A data output method of an output terminal comprising a communication unit that transmits or receives electronic data and a specific code for specifying a destination of the electronic data, a storage device, an antenna that reads an identification code from an IC chip, and an output unit that outputs the electronic data, the data output method comprising:
    reading, by the antenna, the identification code when the IC chip storing the identification code is within a predetermined range;
    transmitting the identification code read by the antenna and a terminal identification code for identifying the output terminal corresponding to the antenna having read the identification code among a plurality of output terminals;
    receiving the electronic data and the specific code based on the terminal identification code;
    storing the electronic data and specific code in the storage device;
    determining whether the identification code read by the antenna corresponds to the specific code stored in the storage device; and
    when determining that the identification code corresponds to the specific code, outputs the electronic data from the output unit.

8. An output terminal which communicates with other output terminal, the output terminal and the other output terminal being installed at separated positions, the output terminal comprising:
    a communication unit that transmits or receives electronic data and a specific code for specifying a destination of the electronic data;
    a storage device;
    an antenna that reads an identification code from an IC chip when the IC chip storing the identification code is within a predetermined range;
    an output unit that outputs the electronic data; and
    a CPU that
        determines whether the identification code read by the antenna corresponds to the specific code stored in the storage device,
        transmits the identification code read by the antenna and a terminal identification code for identifying the output terminal corresponding to the antenna having read the identification code among a plurality of output terminals,
        receives the electronic data and the specific code based on the terminal identification code,
        stores the electronic data and specific code in the storage device, and
        when determining that the identification code corresponds to the specific code, outputs the electronic data from the output unit.

9. The output terminal according to claim 8, wherein the predetermined range is communication coverage of the IC chip.

10. The output terminal according to claim 8, wherein the output terminal includes a facsimile machine.

11. The output terminal according to claim 8, wherein the IC chip is provided on an IC card.

12. The output terminal according to claim 8, wherein the CPU, after the output unit outputs the electronic data, transmits a notification signal for notifying that the electronic data has been outputted, to a person using the output terminal outputting the electronic data.

13. The output terminal according to claim 8, wherein the CPU, after the output unit outputs the electronic data, transmits through an electronic mail a notification signal for notifying that the electronic data has been outputted, to a person using the output terminal outputting the electronic data.

14. A data output system for transmitting or receiving electronic data at a plurality of output terminals installed at separated positions, each of the output terminals comprising:
 a communication unit that transmits or receives the electronic data and a specific code for specifying a destination of the electronic data;
 a storage device;
 an antenna that reads an identification code from an IC chip when the IC chip storing the identification code is within a predetermined range; and
 an output unit that outputs the electronic data,
 wherein each of the output terminals
 determines whether the identification code read by the antenna corresponds to the specific code stored in the storage device,
 transmits the identification code read by the antenna and a terminal identification code for identifying the output terminal corresponding to the antenna having read the identification code among a plurality of output terminals,
 receives the electronic data and the specific code based on the terminal identification code,
 stores the electronic data and specific code in the storage device, and
 when determining that the identification code corresponds to the specific code, outputs the electronic data from the output unit.

15. The data output system according to claim 14, wherein the predetermined range is communication coverage of the IC chip.

16. The data output system according to claim 14, wherein the output terminal includes a facsimile machine.

17. The data output system according to claim 14, wherein the IC chip is provided on an IC card.

18. The data output system according to claim 14, wherein each of the output terminals, after the output unit outputs the electronic data, transmits a notification signal for notifying that the electronic data has been outputted, to a person using the output terminal outputting the electronic data.

19. The data output system according to claim 14, wherein each of the output terminals, after the output unit outputs the electronic data, transmits through an electronic mail a notification signal for notifying that the electronic data has been outputted, to a person using the output terminal outputting the electronic data.

* * * * *